US007409389B2

(12) United States Patent
Ananthanarayanan et al.

(10) Patent No.: US 7,409,389 B2
(45) Date of Patent: Aug. 5, 2008

(54) MANAGING ACCESS TO OBJECTS OF A COMPUTING ENVIRONMENT

(75) Inventors: Rajagopal Ananthanarayanan, Milpitas, CA (US); Craig F. Everhart, Chapel Hill, NC (US); Venkateswararao Jujjuri, Beaverton, OR (US); Robert M. Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 10/427,081

(22) Filed: Apr. 29, 2003

(65) Prior Publication Data

US 2004/0220976 A1 Nov. 4, 2004

(51) Int. Cl.
*G06F 7/00* (2006.01)
*G06F 17/00* (2006.01)
*G06F 12/00* (2006.01)
*G06F 13/00* (2006.01)
*G06F 13/28* (2006.01)
*G06F 17/30* (2006.01)

(52) U.S. Cl. .................. 707/8; 707/103 R; 711/141
(58) Field of Classification Search ............... 707/1–10, 707/100–204; 711/100–149; 709/104–107
See application file for complete search history.

(56) References Cited

U.S. PATENT DOCUMENTS

| | | | | |
|---|---|---|---|---|
| 5,060,144 A | * | 10/1991 | Sipple et al. ................ 710/200 |
| 5,664,186 A | | 9/1997 | Bennett et al. .............. 395/620 |
| 5,761,659 A | * | 6/1998 | Bertoni .......................... 707/8 |
| 5,911,776 A | | 6/1999 | Guck ......................... 709/217 |
| 6,023,706 A | * | 2/2000 | Schmuck et al. ............ 707/200 |
| 6,035,379 A | | 3/2000 | Raju et al. .................. 711/162 |
| 6,041,383 A | * | 3/2000 | Jeffords et al. .............. 710/200 |
| 6,263,350 B1 | * | 7/2001 | Wollrath et al. ............. 707/206 |
| 6,389,420 B1 | * | 5/2002 | Vahalia et al. ................. 707/8 |
| 6,460,048 B1 | | 10/2002 | Teng et al. .............. 707/103 R |

(Continued)

FOREIGN PATENT DOCUMENTS

EP 0 689 140 12/1995

(Continued)

OTHER PUBLICATIONS

Sapna Mahendra Bafna , "A Study of Consistency Mechanisms in Distributed Systems; with a comparison between Distributed Lock Managers and Leases", Aug. 12, 2002, 4 pages.*

(Continued)

*Primary Examiner*—Hosain T Alam
*Assistant Examiner*—Shew-Fen Lin
(74) *Attorney, Agent, or Firm*—Abdy Raissinia, Esq.; Blanche E. Schiller, Esq.; Heslin Rothenberg Farley & Mesiti P.C.

(57) ABSTRACT

Access to objects of a computing environment is managed. Access to an object of the computing environment is prohibited via one cached entity corresponding to the object, while access to the object is allowed via another cached entity. The cached entities are concurrently maintained for a period of time, but the one cached entity is in a shadow state. In one example, the cached entities are session locks and the object is a file system object.

3 Claims, 9 Drawing Sheets

U.S. PATENT DOCUMENTS

| | | | |
|---|---|---|---|
| 6,499,031 B1 * | 12/2002 | Hopmann et al. | 707/8 |
| 6,502,108 B1 * | 12/2002 | Day et al. | 707/203 |
| 6,529,906 B1 * | 3/2003 | Chan | 707/8 |
| 6,715,146 B1 * | 3/2004 | Simmons et al. | 718/104 |
| 6,769,048 B2 * | 7/2004 | Goldberg et al. | 711/141 |
| 6,775,703 B1 * | 8/2004 | Burns et al. | 709/228 |
| 6,842,754 B2 * | 1/2005 | Muntz | 707/10 |
| 6,938,139 B2 * | 8/2005 | Miller et al. | 711/163 |
| 6,941,310 B2 * | 9/2005 | Ahad et al. | 707/100 |
| 7,065,558 B2 * | 6/2006 | Ramanathan et al. | 709/217 |
| 7,093,230 B2 * | 8/2006 | E et al. | 717/100 |
| 2002/0019874 A1 * | 2/2002 | Borr | 709/229 |
| 2002/0049718 A1 | 4/2002 | Kleiman et al. | |
| 2004/0054854 A1 * | 3/2004 | Thiyagaranjan et al. | 711/141 |
| 2004/0186861 A1 * | 9/2004 | Phatak | 707/200 |

FOREIGN PATENT DOCUMENTS

| | | |
|---|---|---|
| JP | 6222968 A | 5/1995 |

OTHER PUBLICATIONS

"Consistency and Locking for Distributed Updates to Web Servers Using a File System", Randal C. Burns, Robert M. Rees, Darrell D. E. Long, pp. 15-21.

"Fault-Tolerant Real-Time Objects", K.H. Kim, Chittur Subbaraman, Communications of the ACM, Jan. 1997/vol. 40. No. 1, pp. 75-82.

"IBM Storage Tank™ A Distributed Storage System", IBM Corporation, Jan. 24, 2002, http//www.Almaden.IBM.com/StorageSystems/file-systems/storage-tank/extstoragetankpaper01_24_02.pdf.

* cited by examiner

MANAGING ACCESS TO OBJECTS OF A COMPUTING ENVIRONMENT

TECHNICAL FIELD

This invention relates, in general, to processing within a computing environment, and in particular, to managing access to objects of the computing environment.

BACKGROUND ART

Access to various objects, such as files, directories, etc., of a computing environment is controlled in order to provide security and to preserve data integrity. In many computing environments, locking protocols are used in the controlling. For instance, in distributed file systems, access to file system objects is controlled via a plurality of locks. As examples, some locks are used to coordinate the caching of file system content, while other locks are used to coordinate access to file system objects by different clients.

To enhance system performance, one or more of the locks are cached in one or more client caches. Thus, it is important to ensure that the cached locks are valid at the time of use. Although caching protocols exist, a need still exists for a capability that further manages cached locks, or other cached entities. Further, a need exists for a capability that manages access to objects of a computing environment.

DISCLOSURE OF INVENTION

The shortcomings of the prior art are overcome and additional advantages are provided through the provision of a method of managing access to objects of a computing environment. The method includes, for instance, prohibiting access to an object of the computing environment via a cached entity corresponding to the object; and allowing access to the object via another cached entity corresponding to the object, wherein the cached entity and the another cached entity are concurrently maintained for a period of time.

In a further aspect of the present invention, a method of managing access to objects of a file system is provided. The method includes, for instance, facilitating, by a server of the file system, providing of an inconsistent state of an entity corresponding to an object of the file system; invalidating, by a client of the file system, one or more existing opens of the object, in response to the inconsistent state; and permitting, by the client, one or more other opens of the object, in response to another entity corresponding to the object being provided by the server, wherein at least one invalidated existing open and at least one other open are concurrently in an open state for a period of time.

In another aspect of the present invention, a method of managing access to objects of a computing environment is provided. The method includes, for instance, facilitating, by a server of the computing environment, providing of an inconsistent state of an entity associated with an object of the computing environment; and providing, by the server, another entity associated with the object, wherein the inconsistent entity and the another entity are concurrently accessible for a period of time to manage access to the object.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Overview

In accordance with an aspect of the present invention, a capability is provided for managing access to objects of a computing environment. Access to an object is prohibited via one cached entity corresponding to the object, while access to the object is allowed via another cached entity. The one cached entity and the another cached entity are concurrently maintained for at least some time. In one example, the cached entities represent locks that control access to the object. For instance, in a file system, one or more existing opens of a file system object are invalidated, in response to a cached entity (e.g., a lock) associated with the file system object becoming inconsistent. However, while at least one invalidated existing open is maintained in an invalid, but open state, one or more new opens of the file system object are permitted to proceed by employing another cached entity representative of the object.

DETAILED DESCRIPTION

Figure 1A:
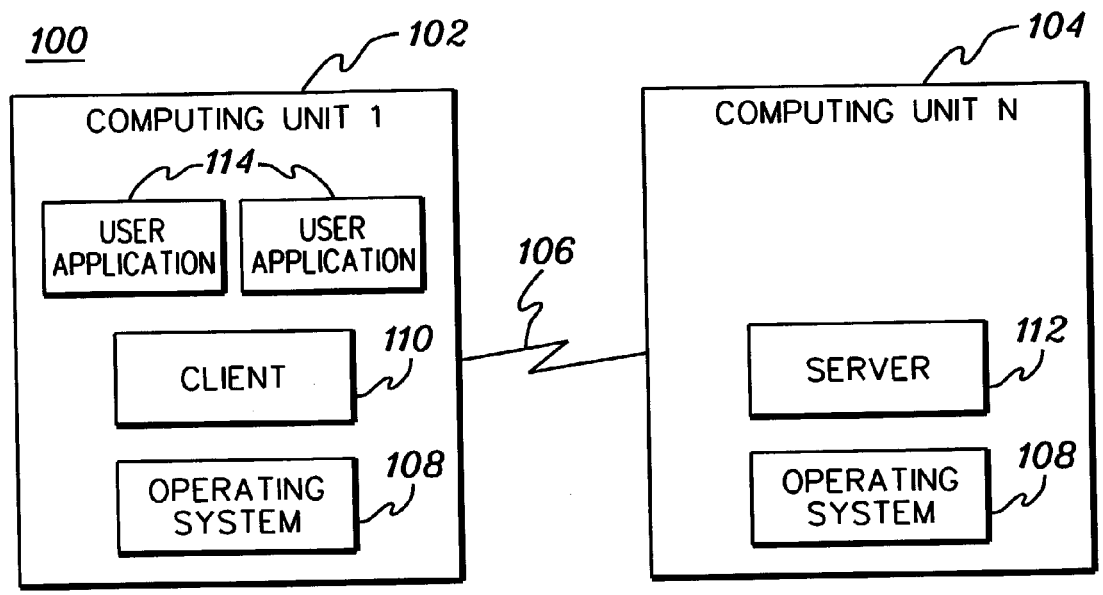
FIG. 1a depicts one embodiment of a computing environment to incorporate and use one or more aspects of the present invention.

One embodiment of a computing environment to incorporate and use one or more aspects of the present invention is described with reference to FIG. 1a. A computing environment 100 includes, for instance, a computing unit 102 coupled to another computing unit 104 via a connection 106. A computing unit includes, for instance, a personal computer, a laptop, a workstation, a mainframe, a mini-computer, or any other type of computing unit. Computing unit 102 may or may not be the same type of unit as computing unit 104. The connection coupling the units is a wire connection or any type of network connection, such as a local area network (LAN), a wide area network (WAN), a token ring, an Ethernet connection, an internet connection, etc.

In one example, each computing unit executes an operating system 108, such as, for instance, the z/OS operating system, offered by International Business Machines Corporation, Armonk, New York; a UNIX operating system; Linux; Windows; or other operating systems, etc. The operating system of one computing unit may be the same or different from another computing unit. Further, in other examples, one or more of the computing units may not include an operating system.

In one embodiment, computing unit 102 includes a client application (a.k.a., a client) 110 which is coupled to a server application (a.k.a., a server) 112 on computing unit 104. Client 110 communicates with server 112 via, for instance, a Network File System (NFS) protocol over a TCP/IP link coupling the applications. Further, on at least one computing unit, one or more user applications 114 are executing.

Figure 1B:
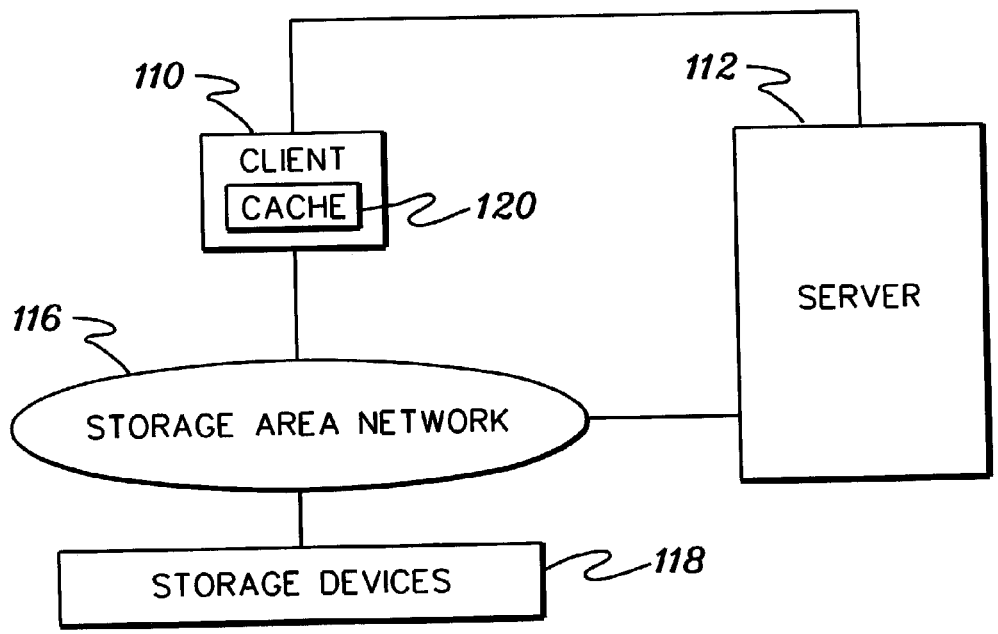
FIG. 1b depicts a file system to incorporate and use one or more aspects of the present invention.

In one particular embodiment, the environment includes a file system (FIG. 1*b*), such as a distributed file system, in which a storage area network 116 is employed to facilitate access by one or more clients 110 and one or more servers 112 to one or more storage devices 118 over a high speed link. The use of a storage area network enables the provision of high performance distributed file systems, which allow clients to obtain data directly from storage devices rather than accessing data through a server that performs reads and writes on their behalf. However, the client accesses are coordinated via one or more servers.

In a distributed file system, applications running on client computing units including, for instance, user applications, client applications, etc., access a file system namespace, which is, for instance, distributed across one or more computing units. The namespace includes one or more file system objects accessible by the applications. In one example, the name space is organized as a tree structure and includes various types of objects, such as, for instance, files, which include data accessible to clients; directories used to organize other objects; and symbolic links, which are points in the tree where the name lookup of an object is redirected.

Associated with the file system objects are entities used, for instance, to facilitate access to the file system objects. These entities are cached in a client resident cache 120 for faster access. In one embodiment, one or more applications (e.g., user applications, client applications) have access to the cached entities.

Figure 2A:
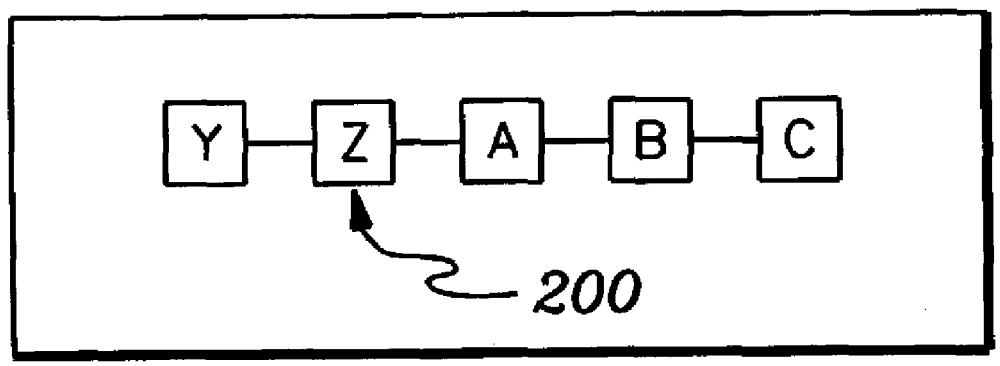
FIGS. 2a-2b depict examples of a client cache of FIG. 1b, in accordance with an aspect of the present invention.

A cached entity has a plurality of attributes associated therewith, including, for instance, a reference count indicating how many applications have a handle to the entity; and a validity indicator specifying whether the cached entity is valid. The cached entities are coupled to one another in a data structure, such as a linked list 200 (FIG. 2*a*), as one example.

Access to file system objects is controlled to maintain security and data integrity. One embodiment of the logic associated with managing access to file system objects is described below.

Figure 2B:
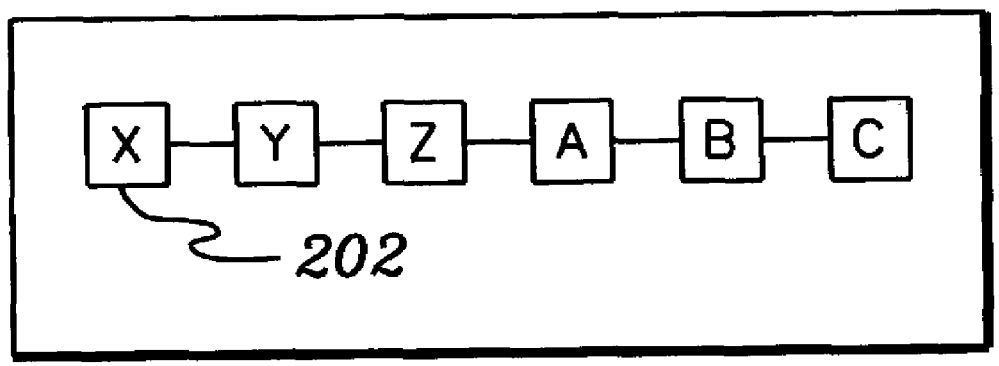
Figure 3:
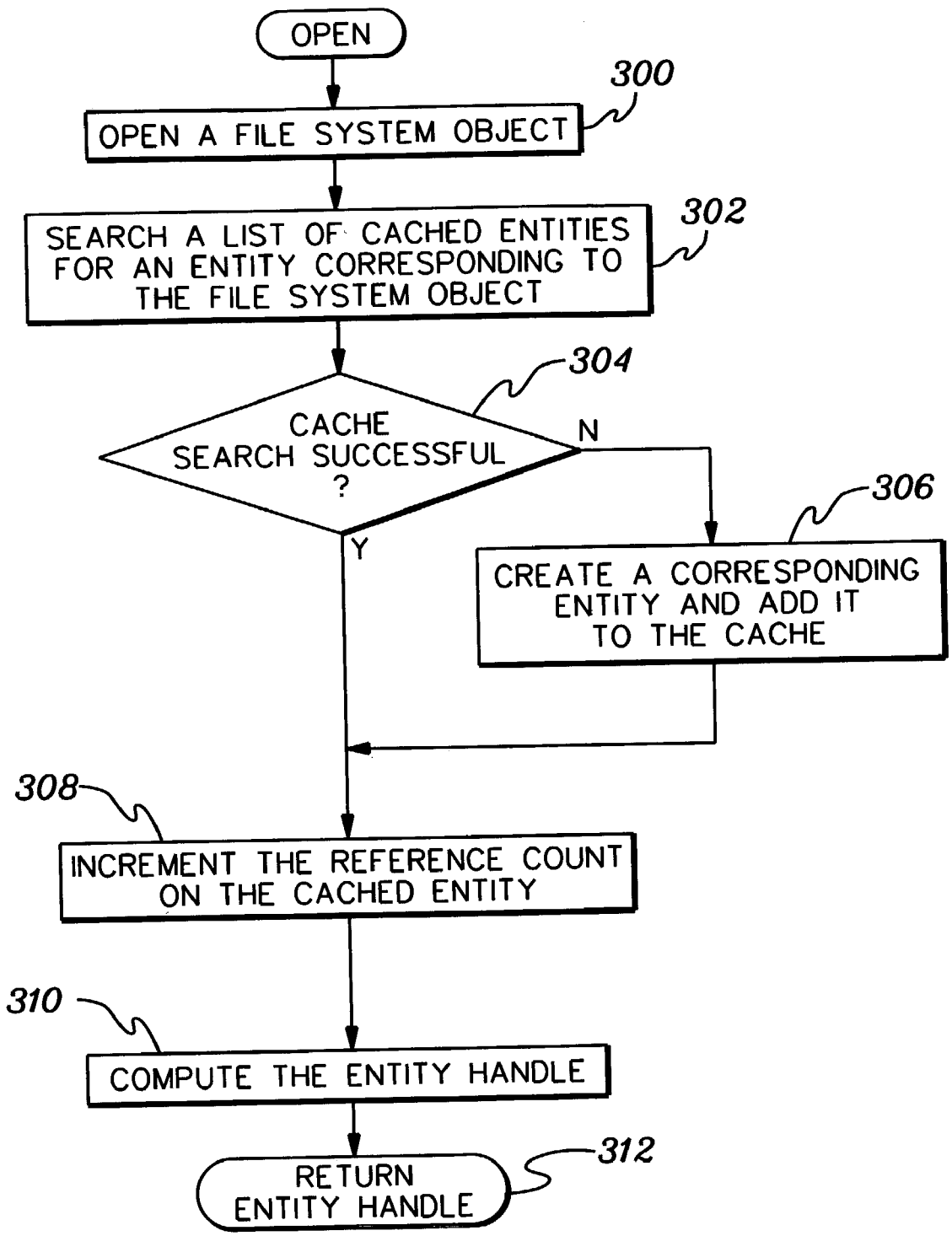
FIG. 3 depicts one embodiment of the logic associated with opening a file system object, in accordance with an aspect of the present invention.

Referring initially to FIG. 3, an application requests an open of a file system object (such as a file), STEP 300. In one example, the application is executing on a client computing unit, and the open includes performing a search in the client's cache for an entity associated with the requested file system object, STEP 302. The entity is used in facilitating access to the file system object, and for purposes of illustration, is referred to herein as Entity X. If the associated entity is not in the cache, INQUIRY 304, an instance of the entity is created and added to the cache, STEP 306. This includes, for instance, appending Entity X to the linked list of cached entities, as shown at 202 (FIG. 2*b*). Returning to FIG. 3, thereafter, the reference count of the cached entity is incremented, STEP 308, and a handle for the entity is computed, STEP 310. In one example, this includes determining the address of the cached entity, which is returned as a handle (e.g., Handle Hx), STEP 312.

Referring back to INQUIRY 304, should the cache search be successful, then the reference count of the cached entity is incremented, STEP 308, and processing continues with computing the entity handle, STEP 310. This concludes the open processing.

Figure 4:
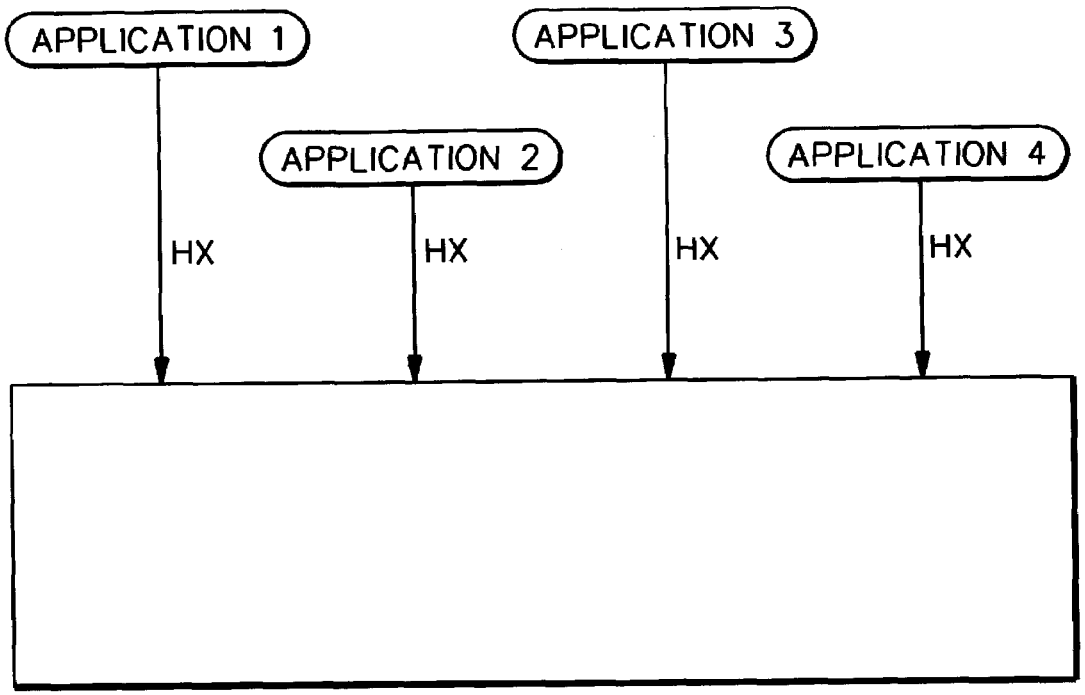
FIG. 4 illustrates multiple applications having a same handle used to access the file system object corresponding to that handle, in accordance with an aspect of the present invention.

One or more applications executing on the client computing unit may request an open of the same file system object. In such a case, each of the applications may obtain the same handle from the client, as shown in FIG. 4. As depicted, Applications 1-4 each receive and use handle Hx for processing.

Figure 5:
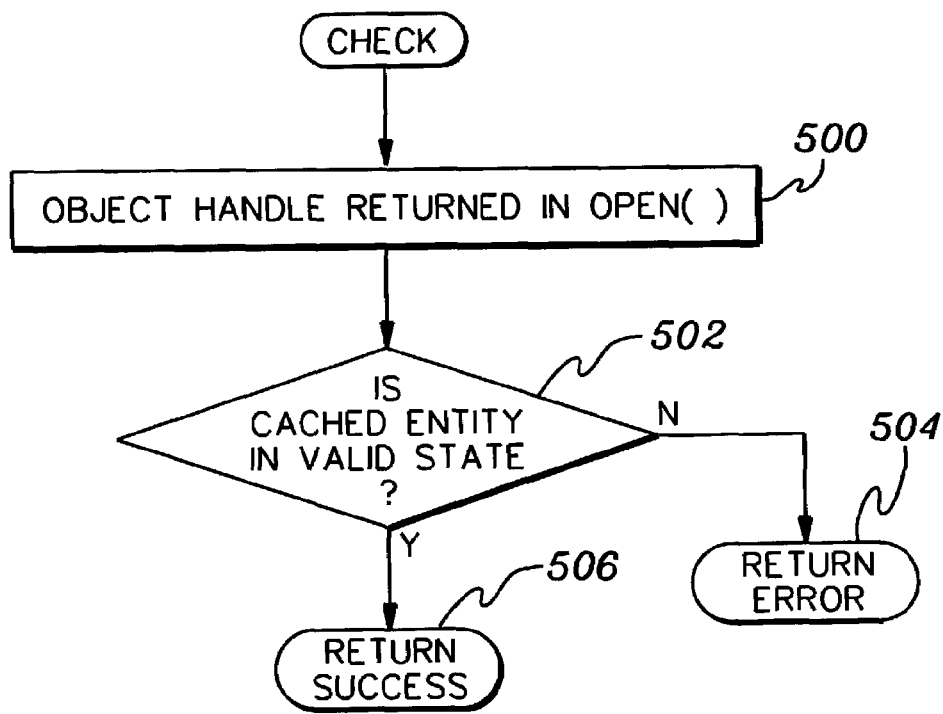
FIG. 5 depicts one embodiment of the logic associated with checking the validity of a cached entity, in accordance with an aspect of the present invention.

During application processing, operations, such as a read or a write operation, are requested against the open file system object. As part of this processing, a check is made as to the validity of the cached entity, which is used in facilitating access to the file system object. One embodiment of the logic associated with this check is described with reference to FIG. 5. The cached entity to be checked for validity is the entity corresponding to the object handle returned in the open, STEP 500. In one example, this checking includes checking the validity indicator of the cached entity. If the entity is in an invalid state, INQUIRY 502, then an error is returned, STEP 504. Otherwise, an indication of success is returned, STEP 506.

Figure 6:
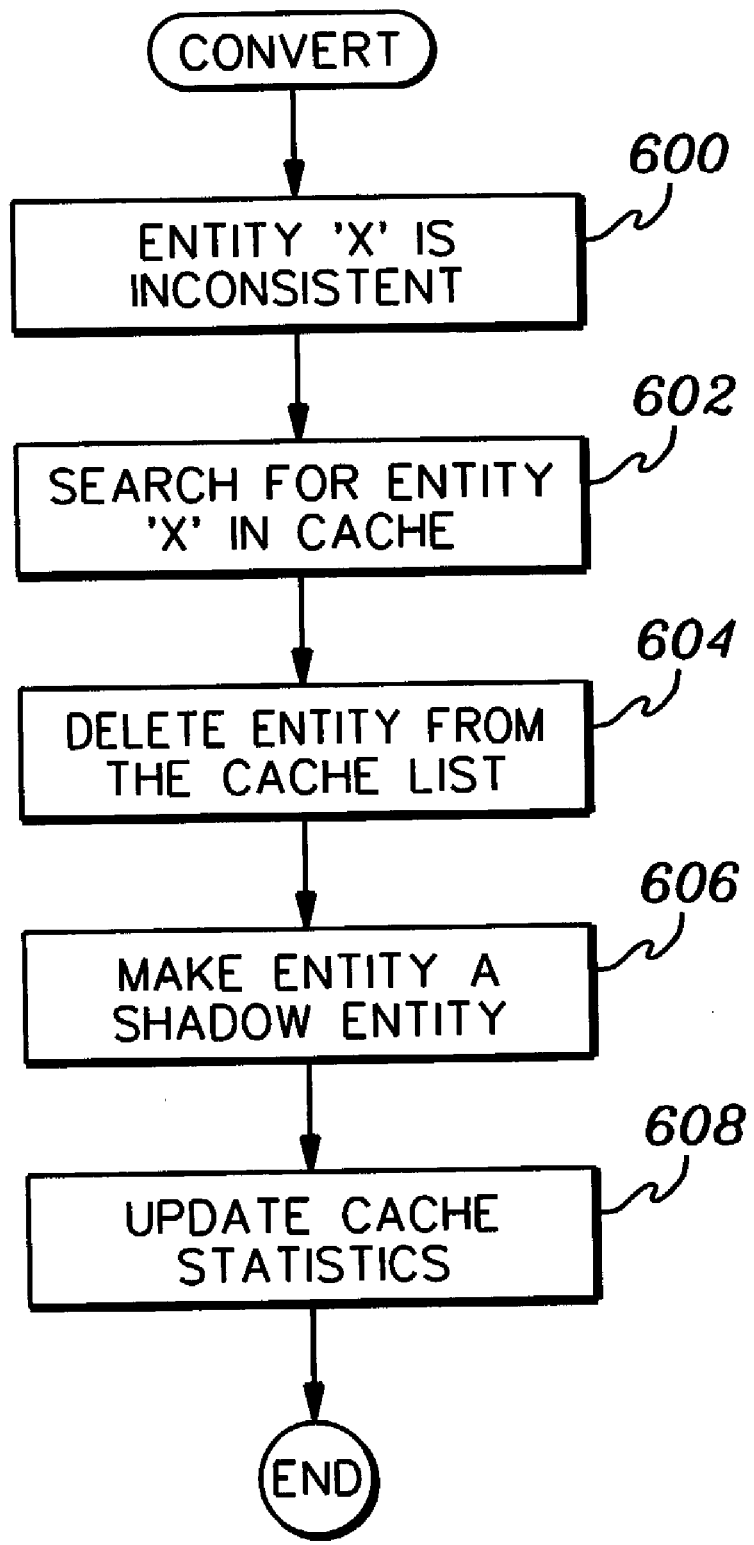
FIG. 6 depicts one embodiment of the logic associated with converting a cached entity to a shadow entity, in accordance with an aspect of the present invention.
Figure 7:
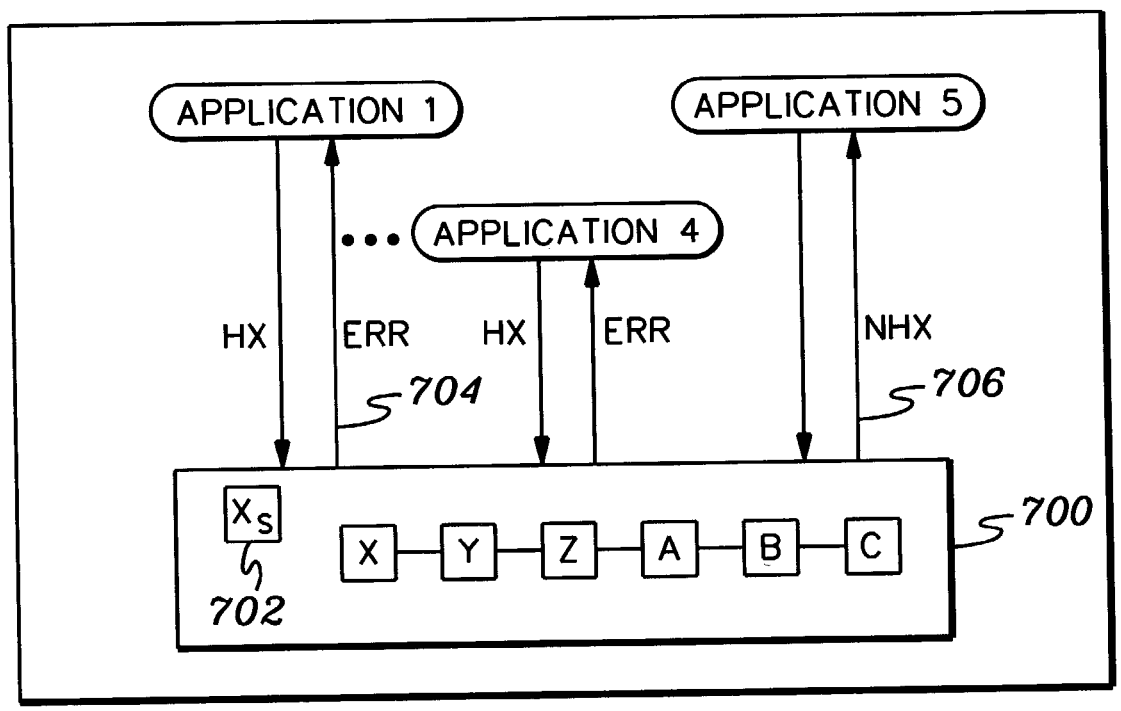
FIG. 7 illustrates one example of applications using an old entity handle and receiving an error, while another application using a new entity handle processes successfully, in accordance with an aspect of the present invention.

At some point, the cached entity may become inconsistent. Should it become inconsistent, then it is converted to a shadow entity, as described with reference to FIG. 6. In response to the cached entity becoming inconsistent, STEP 600, a search is made in the cache for the cached entity, e.g., Entity X, STEP 602. The cached entity is deleted from the linked list of entities, STEP 604. However, the entity remains in the cache as a shadow entity (i.e., a stand-alone entity), STEP 606. For example, the entity is moved to another portion of the cache and marked as a shadow entity. One example of this is shown in FIG. 7, in which a cache 700 has a shadow entity 702. Thereafter, the cache statistics are updated, STEP 608 (FIG. 6). For instance, an entity count for the cache is decremented.

In accordance with an aspect of the present invention, any old opens still refer to the entity using the handle they received in the open, but any new opens will cause a cache miss, since the entity is no longer in the main entity hash table list (e.g., linked list). Therefore, the entity will be brought into the cache and have a new handle. Thus, as shown in the example of FIG. 7, Applications 1-4 still use handle Hx, which causes an error to be returned (704), but Application 5 receives a new handle NHx, which allows a successful access (706). The opens associated with applications 1-4 are therefore invalidated, while the open associated with Application 5 is permitted. The invalidated opens and the permitted open concurrently remain in an open state for a period of time (e.g., until the inconsistent cache entity is closed). After Applications 1-4 close the entity, the entity goes away, and the applications are no longer in an open state with that entity.

Figure 8:
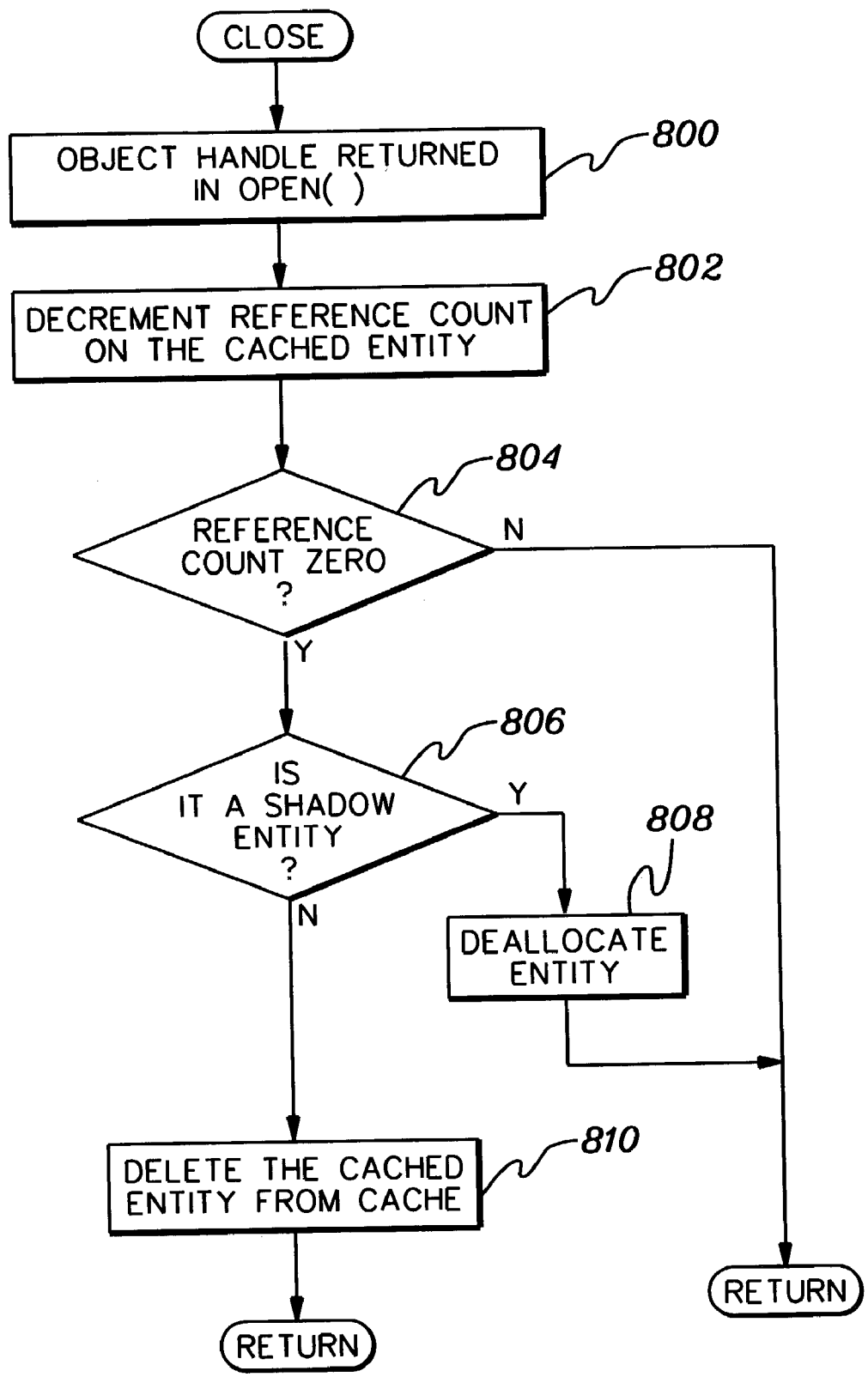
FIG. 8 depicts one embodiment of logic associated with closing a cached entity, in accordance with an aspect of the present invention.

One embodiment of the logic associated with closing a cached entity is described with reference to FIG. 8. The close is performed on the entity having the handle returned in the open, STEP 800. The reference count of the cached entity is decremented, STEP 802. If the reference count is not zero, INQUIRY 804, then close processing is complete. However, if the reference count is zero, then a determination is made as to whether it is a shadow entity, INQUIRY 806. If so, then the entity is deallocated, STEP 808. Otherwise, the entity is deleted from the cache, STEP 810. This concludes the close processing.

Figure 9A:
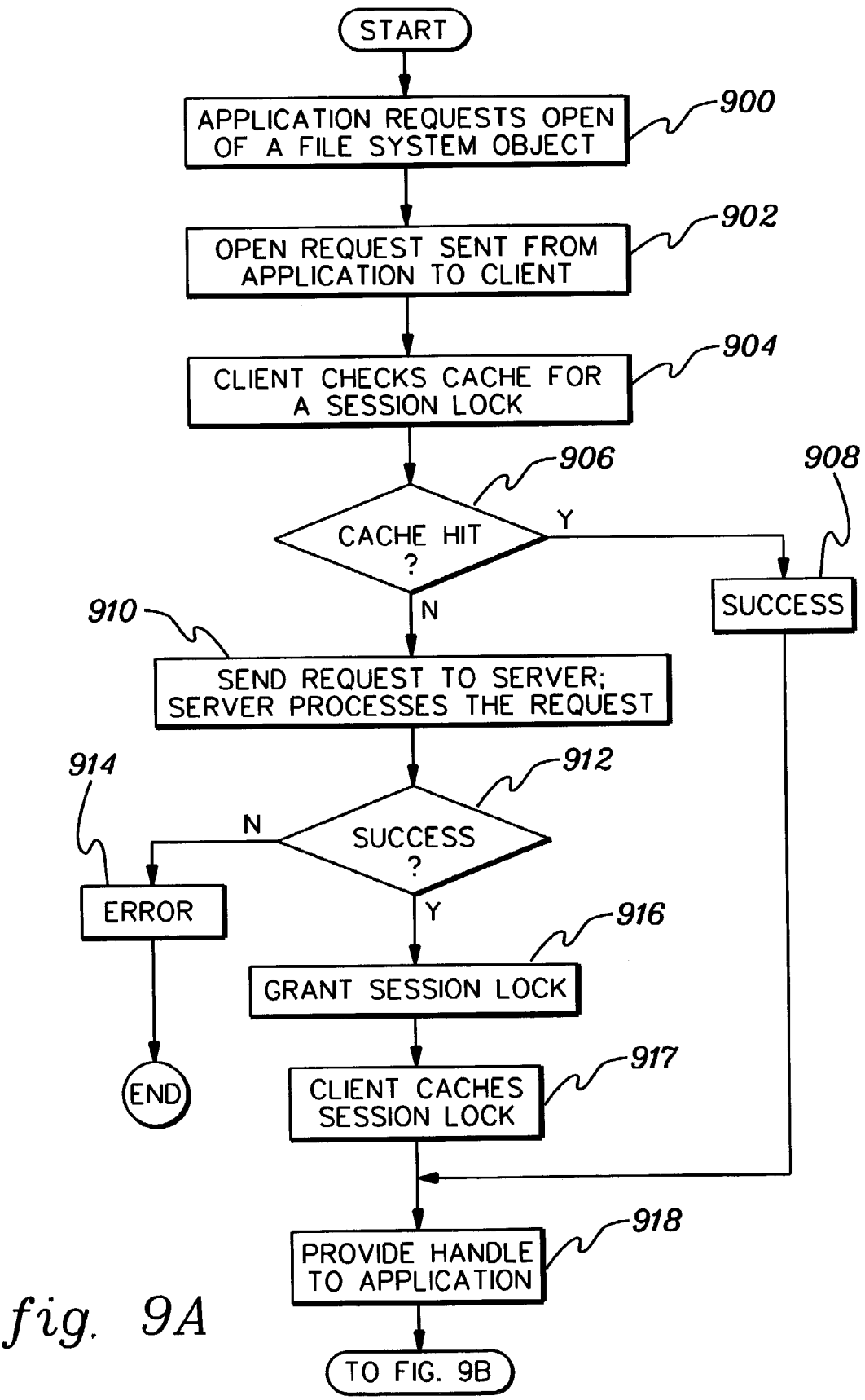
FIGS. 9a-9b depict one embodiment of the logic associated with a particular example in which one or more aspects of the present invention are employed.

Described above is a capability in which new opens of an object are permitted, while actions on the old opens are prohibited. One particular example in which this capability is employed is with a locking mechanism for distributed file systems. For instance, a file system uses a distributed lock, referred to herein as a session lock, to control access to file system objects between different clients of the file system. In one example, each client has one session lock per file system object, but the lock may be serving more than one application associated with that client. For instance, Client 1 obtains a session lock, Entity X, for a file system object, File "Foo". One or more applications of the client use that lock (typically, implicitly, but can be explicitly, in other embodiments) in accessing the file (e.g., read, write, create, find). This is further described below with reference to FIGS. 9*a*-9*b*.

When an application requests an open of a file system object, STEP 900, an open request is sent from the application to the client (e.g., to a Client State Manager (CSM), which is platform independent, via an Installable File System (IFS), which his platform dependent), STEP 902. The client checks its cache for a session lock on the file system object, STEP 904. If there is a cache hit, INQUIRY 906, success is returned to the client, STEP 908. If not, the client sends a request to the server and the server processes the request, STEP 910. If the grant is unsuccessful, INQUIRY 912, then an error is returned, STEP 914. Otherwise, a successful response from the server grants a session lock on the file system object to the requested client, STEP 916. The client caches the session lock, STEP 917, and thus, on subsequent opens, the client returns success locally. So, different applications associated with one client operating on the same file system object may have different file descriptors, but one session lock.

The client provides a handle (e.g., address) of the cached session lock to the application requesting the open, STEP 918. This handle is then used in further processing.

Figure 9B:
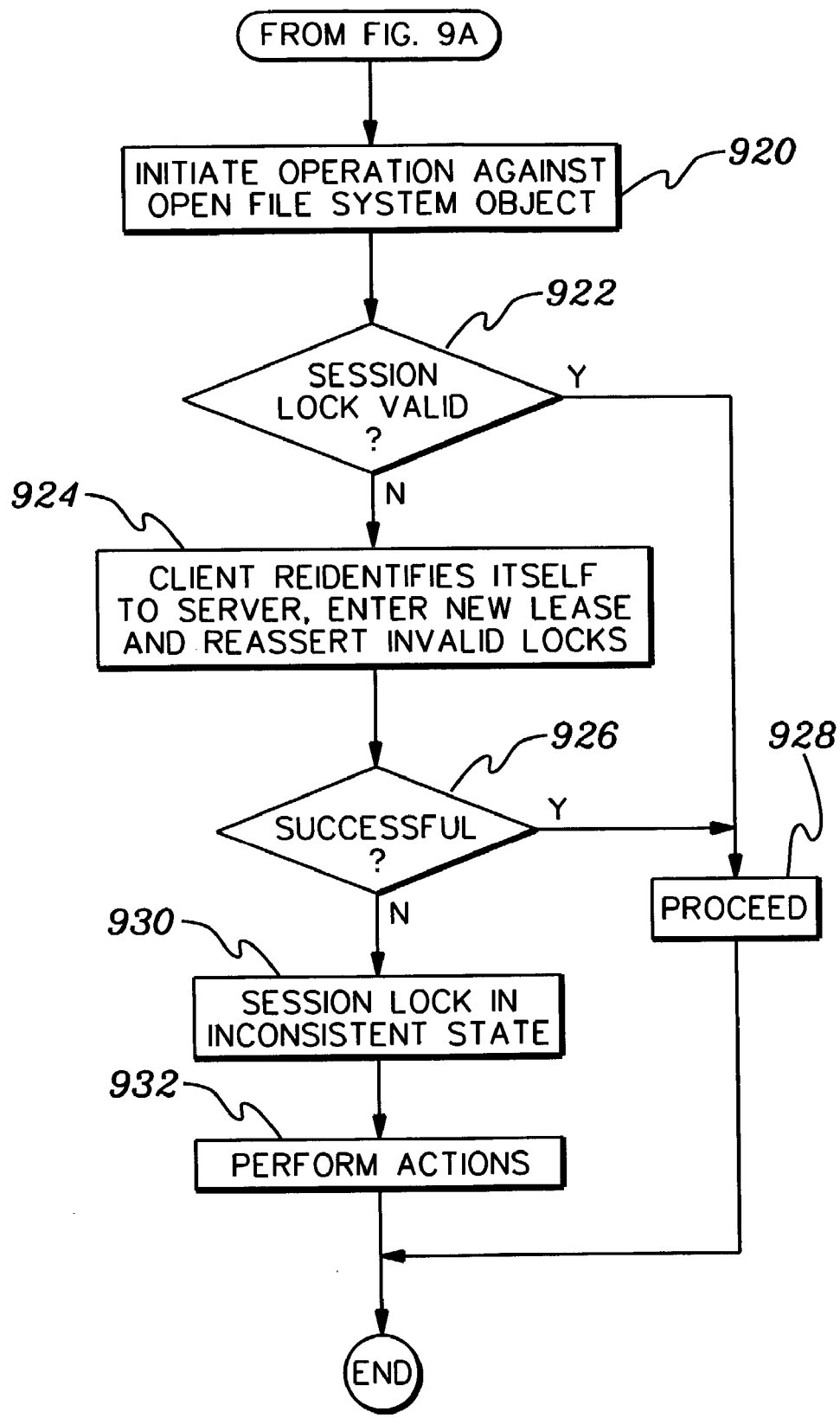

For example, in response to a successful open, one or more operations (e.g., read, write, find, or other operations) are initiated against the open file system object, STEP 920 (FIG. 9*b*). For each operation, a check is made as to the validity of the session lock, INQUIRY 922. In one example, a session lock may become invalid when a lease associated with that lock expires. For instance, a lease is a contract between a client and a server, in which the server guarantees correctness of the data in the client's cache for a specified period of time designated in the lease. The lease can be renewed before it expires. However, if a lease is not renewed (e.g., because of a disconnect, server crash, or for any other reason), then at the end of the lease period, the locks obtained during the lease are invalidated. Thus, the client cannot operate on the cached data, when it does not have a valid lock. Therefore, to proceed with the operations, the client reidentifies itself with the server to enter a new lease, and attempts to reassert the invalid locks, STEP 924. If successful, then the invalid state of the lock is changed to valid by the client and the operation proceeds, STEP 928. Similarly, if the session lock is valid, INQUIRY 922, processing continues.

However, if the reassertion is unsuccessful, INQUIRY 926, then the session lock is in an inconsistent state, STEP 930. Thus, various actions are performed, STEP 932. For instance, any open instances of the file system object are invalidated. To invalidate the open instances, the cached session lock is made a shadow entity, by the client, by marking it as a shadow entity, removing it from the cache list and leaving it in the cache as a stand-alone entity. Since the lock is removed from the cache list, existing references to the session lock will get an error (e.g., due to its shadow state), thereby invalidating the opens associated with those references. The lock is maintained as a stand-alone entity in the cache until the existing references to the object are dropped. Then, the entity is closed. However, new accesses (e.g., opens) to the file corresponding to the shadow entity creates a new cached entity (e.g., a new session lock), permitting new accesses to proceed normally. That is, from the perspective of the client, it is like accessing the lock for the first time. So, the client sends a session lock request to the server and is returned a new session lock. New references to the session lock work properly, but references to the old lock obtain errors.

Advantages

Described in detail above is a capability for managing access to file system objects. While one or more existing opens of a file system object may be invalidated, one or more new opens are permitted. In one example, this is accomplished via cached entities, and in particular, shadow entities. The use of shadow entities advantageously provides the desired management benefits with minimal changes in the existing design and/or code. Further, it improves system performance by allowing file system objects to be accessed, even though one or more old opens are not yet closed. Yet further, by maintaining the cached entities in this manner, it is not necessary to have one session lock instance per each open, which would make the client cache unnecessarily large and difficult to maintain.

Alternate Embodiments

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

For example, although in one embodiment described above, one client is coupled to one server, in other embodiments, one or more clients may be coupled to one or more servers or any combination thereof. The one or more clients may be on one or more computing units. Similarly, the one or more servers may be on one or more computing units. Further, the one or more clients and one or more servers may be on one computing unit.

Additionally, although examples of computing environments have been provided, these are only examples. Other environments may be used. For instance, although an example is described herein with reference to a file system, this is only one example. One or more aspects of the present invention are applicable to other environments. Yet further, although an example is described herein with reference to a session lock, other types of locks or other types of resources may be represented. The cached entities may be for other than locking and can be used for other reasons. As one example, the cached entities may be instances of an object, itself.

Moreover, although in the embodiments described above, a cache entity becomes inconsistent, in response to an expired lease, there may be various other reasons why a cached entity becomes inconsistent. These are all considered a part of the claimed invention. Further, the cached list of entities can be in a data structure other than a linked list.

Yet further, the application requesting access to the file system object can be a variety of applications, including but not limited to, user applications, client applications, or any other type of applications.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

What is claimed is:

1. A method of managing access to objects of a file system, said method comprising:

facilitating, by a server of the file system, providing of an inconsistent state of a lock corresponding to an object of the file system;

invalidating, by a client of the file system, one or more existing open instances of the object, in response to the inconsistent state, wherein existing references to the lock receive an error;

requesting another open of the object, said another open to provide another open instance of the object;

obtaining, by the client, in response to the requesting, a new lock corresponding to the object; and accessing the object using the new lock, wherein the inconsistent lock and the new lock are concurrently maintained in a client cache, until the existing references are dropped, and wherein at least one invalidated existing open instance and the another open instance are concurrently in an open state until the invalidated existing open instances are closed.

2. The method of claim 1, wherein the facilitating comprises rejecting by the server a request by the client to reassert the lock, wherein the inconsistent state is in response to the rejection.

3. The method of claim 2, wherein the request to reassert is in response to expiration of a lease between the client and the server.

* * * * *